United States Patent
Park et al.

(10) Patent No.: US 9,378,076 B2
(45) Date of Patent: Jun. 28, 2016

(54) SERIAL COMMUNICATION TEST DEVICE, SYSTEM INCLUDING THE SAME AND METHOD THEREOF

(71) Applicants: Hyundai Motor Company, Seoul (KR); Kia Motors Corporation, Seoul (KR); Hyundai Autron Company Ltd., Seongnam, Gyeonggi-do (KR)

(72) Inventors: Choong Seob Park, Gyeonggi-do (KR); Ji Haeng Lee, Gyeonggi-do (KR); Kang Hee Cho, Gyeonggi-do (KR); Doo Jin Jang, Seoul (KR)

(73) Assignees: Hyundai Motor Company, Seoul (KR); Kia Motors Corporation, Seoul (KR); Hyundai Autron Company Ltd., Seongnam, Gyeonggi-do (KR)

(*) Notice: Subject to any disclaimer, the term of this patent is extended or adjusted under 35 U.S.C. 154(b) by 177 days.

(21) Appl. No.: 14/204,053

(22) Filed: Mar. 11, 2014

(65) Prior Publication Data
US 2015/0160993 A1 Jun. 11, 2015

(30) Foreign Application Priority Data
Dec. 10, 2013 (KR) .......................... 10-2013-0153279

(51) Int. Cl.
G06F 11/00 (2006.01)
G06F 11/07 (2006.01)
G06F 11/22 (2006.01)

(52) U.S. Cl.
CPC .......... *G06F 11/0745* (2013.01); *G06F 11/221* (2013.01)

(58) Field of Classification Search
CPC .................................................. G06F 11/0745
USPC .................................. 714/31, 32, 5.1, 5.11, 10
See application file for complete search history.

(56) References Cited

U.S. PATENT DOCUMENTS

| | | | | |
|---|---|---|---|---|
| 8,855,962 | B2 * | 10/2014 | Jindal | ...................... G05B 1/00 702/117 |
| 2011/0153939 | A1 | 6/2011 | Choi | |
| 2013/0235014 | A1 | 9/2013 | Lee et al. | |
| 2013/0258906 | A1 * | 10/2013 | Rohatschek | ........ H04L 41/0803 370/255 |

FOREIGN PATENT DOCUMENTS

| | | |
|---|---|---|
| JP | 2000-299694 A | 10/2000 |
| JP | 2013131836 A | 7/2013 |
| KR | 10-2005-0101846 | 10/2005 |
| KR | 10-2011-0072279 A | 6/2011 |

* cited by examiner

*Primary Examiner* — Dieu-Minh Le
(74) *Attorney, Agent, or Firm* — Mintz Levin Cohn Ferris Glovsky and Popeo, P.C.; Peter F. Corless

(57) ABSTRACT

A serial communication test device, a system including the same, and a method thereof are provided, which relate to a technology that allows a master chip and a slave ship for Serial Peripheral Interface (SPI) communication to double-check data to increase reliability. The serial communication test device includes an interface that is configured to transmit and receive data to and from an external chip. A controller is configured to store data to be error-checked in a register to output the stored data to the external chip through the interface and to store data received from the external chip through the interface in a data storage unit. The controller compares the data stored in the register with the data stored in the data storage unit and determines whether the data stored in the register is substantially similar to data to be error-checked.

8 Claims, 5 Drawing Sheets

US 9,378,076 B2

SERIAL COMMUNICATION TEST DEVICE, SYSTEM INCLUDING THE SAME AND METHOD THEREOF

CROSS-REFERENCE TO RELATED APPLICATION

The priority of Korean patent application No. 10-2013-0153279 filed on Dec. 10, 2013, the disclosure of which is hereby incorporated in its entirety by reference, is claimed.

BACKGROUND

Embodiments of the present invention relate to a serial communication test device, a system including the same, and a method thereof, and more particularly to a technology that allows a master chip and a slave ship for Serial Peripheral Interface (SPI) communication to check data, resulting in increased reliability.

Generally, a Serial Peripheral Interface (SPI) device is installed in a master chip (e.g., CPU), for the SPI device to perform data communication between the master chip and the slave chip (e.g., a peripheral device such as a multimedia device). The SPI device is configured to use a serial communication scheme. Unlike other serial communication schemes, the SPI device enables the master chip and the slave chip to simultaneously communicate with each other using clock synchronization. In other words, the SPI device enables the CPU and the peripheral device to simultaneously communicate with each other to communicate valid data simultaneously between the CPU and the peripheral device.

Further, the SPI device, serving as an interface configured to implement serial communication between two devices, is configured to use a data output pin, a data input pin, a clock pin, and a slave selection pin thereof. Accordingly, the SPI device operates as a simple and serial interface and at the same time operates at a high speed, so that convenient and various functions can be implemented. In addition, the SPI device is a protocol that adds or connects various peripheral devices to applications having rapidly changing large capacity data, such as a video game system, a digital camera, a car audio, a navigation system, a set-top box, a PDA, an MP3 player, etc.

Moreover, the SPI device is accommodated into communication systems configured to perform communication between a central processing unit (CPU) and one or more peripheral devices. However, the SPI device is configured to interconnect two microprocessors to allow the two microprocessors to communicate with each other. One microprocessor may operate in a master mode, and the other microprocessor may operate in a slave mode. On the contrary, a conventional SPI device may be unable to determine whether data has been correctly transferred from the master chip to the slave chip using the master chip or the slave chip. In other words, when an unexpected error occurs in transmission/reception (Tx/Rx) data, the conventional SPI device may have difficulty in recognizing whether the error occurs by malfunction of the master chip used for data transmission, whether the master chip initially transmits erroneous data, whether the error occurs in communication between the master chip and the slave chip, or whether the error occurs due to a malfunction of the slave chip receiving data. As a result, the master chip and the slave chip may be unable to recognize the presence or absence of error(s) in data communication, resulting in a potential malfunction.

To improve a serial communication quality, the SPI device may perform error detection and error correction. The master chip should detect errors of read data as well as obtain either parity information requisite for error correction or Cyclic Redundancy Check (CRC) information. However, the conventional error check scheme uses a significantly long time period for error detection or error correction, and is unable to correctly perform error checking.

SUMMARY

The present invention provides a serial communication test device, a system including the same, and a method thereof. In particular, the present invention relates to a technology that allows a master chip (e.g., drive semiconductor) and a slave chip to determine the presence or absence of an error in Serial Peripheral Interface (SPI) communication, to increase accuracy and reliability of data communication.

In accordance with one aspect of the embodiment, a serial communication test device may include: an interface configured to transmit and receive data to and from an external chip; a register configured to store data to be error-checked to output the stored data to the external chip via the interface; a data storage unit configured to store data received from the external chip via the interface; a comparison unit configured to compare the data stored in the register with the data stored in the data storage unit; and an error check controller configured to determine whether the data stored in the register is substantially similar to data to be error-checked, and configured to operate the register and the comparison unit.

In accordance with another aspect of the embodiment, a serial communication test system may include: a master chip configured to read data to be error-checked, and retransmit the read data; and a slave chip configured to transmit the data to be error-checked to the master chip, write data received from the master chip, and compare data applied to the master chip with data received from the master chip to perform the error checking.

In accordance with another aspect of the embodiment, a serial communication test method may include: transmitting data stored in a register to a master chip; storing data received from the master chip to a data storage unit; and performing an error check operation by comparing the data stored in the register with the data stored in the data storage unit.

DETAILED DESCRIPTION

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present invention, examples of which are illustrated in the accompanying drawings. Wherever possible, the same reference numbers will be used throughout the drawings to refer to the same or like parts.

Figure 1:
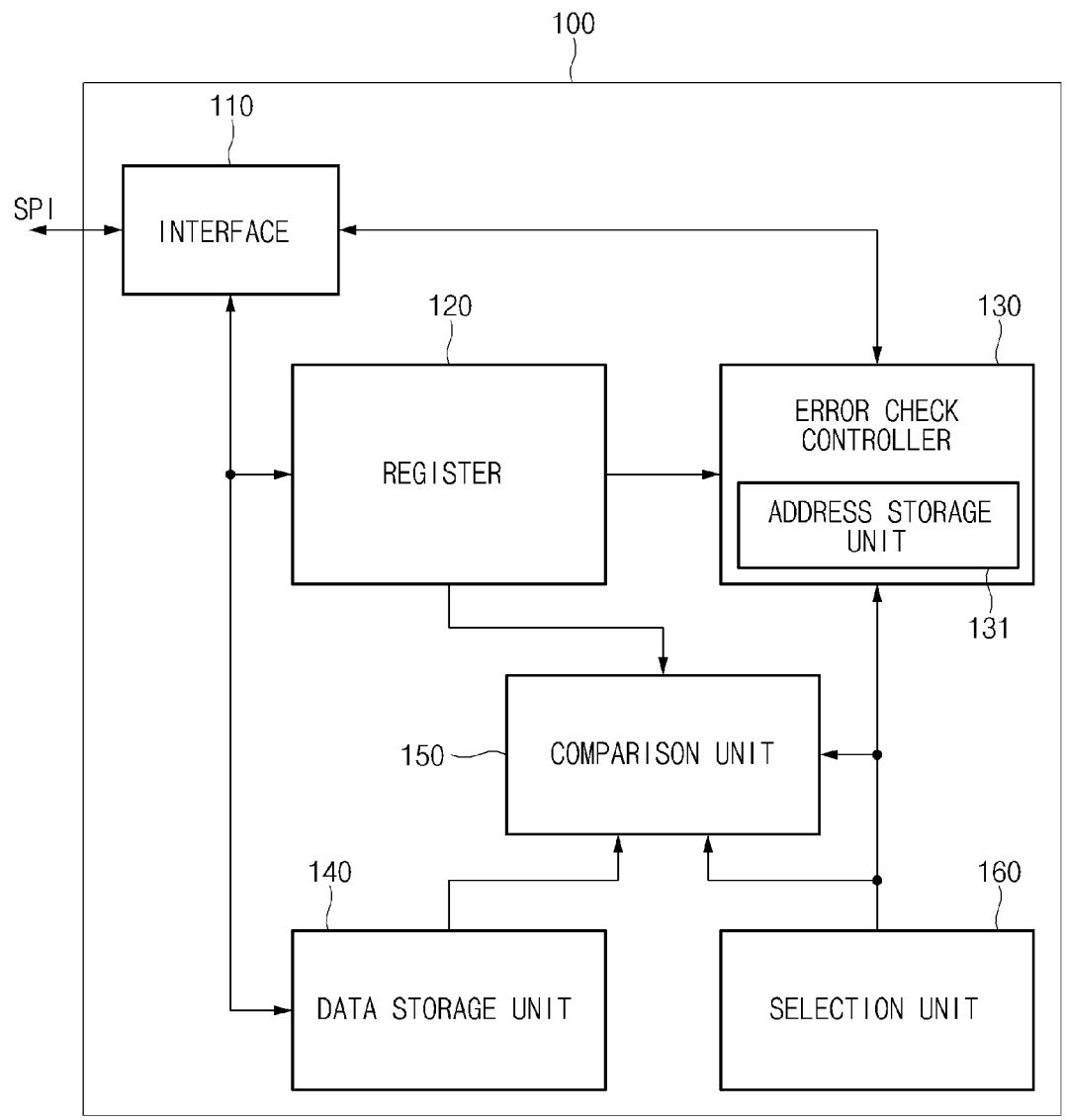
FIG. 1 is an exemplary block diagram illustrating a serial communication test device according to an exemplary embodiment of the present invention.

FIG. 1 is an exemplary block diagram illustrating a serial communication test device according to an exemplary embodiment. Referring to FIG. 1, the serial communication test device may include a slave chip 100 such as a drive semiconductor or an integrated circuit (IC). The slave chip 100 may include an interface 110, a register 120, an error check controller 130, a data storage unit 140, a comparison unit 150, and a selection unit 160.

In particular, the interface 110 may be configured to communicate with an external master chip via Serial Peripheral Interface (SPI) communication. Although the exemplary embodiment discloses that the interface 110 may use SPI communication for convenience of description and better understanding of the present invention, the scope or spirit of the present invention is not limited thereto and other serial communication may also be used without change.

The register 120 may be configured to store data requisite for error detection. In addition, register data for diagnosing a defective or faulty part or memory data may be pre-stored in the register 120. Data stored in the register 120 may be transmitted to the external master chip by the controller 130 via the interface 110. The register 120 may be configured to output stored information to the error check controller 130 and the comparator 150.

In addition, the error check controller 130 may be configured to confirm whether the presence or absence of an error in data received from the register 120 should be double checked (e.g., whether the data should be checked a second time). In other words, when the presence or absence of an error in data received from the register 120 needs to be checked, the error check controller 130 may be configured to confirm an address of the corresponding data. The address of the corresponding data may be stored in the address storage unit 131. In addition, the data storage unit 140 may be configured to store data received via the interface 110 to double check the presence or absence of an error.

The comparison unit 150 may be configured to compare data read from the register 120 with data written in the data storage unit 140, and output the comparison result. In other words, when data pre-stored in the register 120 is substantially similar to data written in the data storage unit 140, the comparison unit 150 may be configured to determine the absence of an error. Additionally, when data pre-stored in the register 120 is different from data written in the data storage unit 140, the comparison unit 150 may be configured to determine the presence of an error.

In addition, the selection unit 160 may be configured determine whether the presence or absence of a data error should be double-checked. In other words, when the selection unit 160 attempts to detect the presence or absence of a data error again, the selection unit 160 may be configured to output an operation-ON signal to the error check controller 130 and the comparison unit 150. Further, when the selection unit 160 does not detect the presence or absence of a data error again, the selection unit 160 may be configured to output an operation-OFF signal to the error check controller 130 and the comparison unit 150. In particular, after the master chip 200 reads data of the slave chip 100, the error double-checking operation may be terminated, and a general function of the slave chip 100 may be performed.

Figure 2:
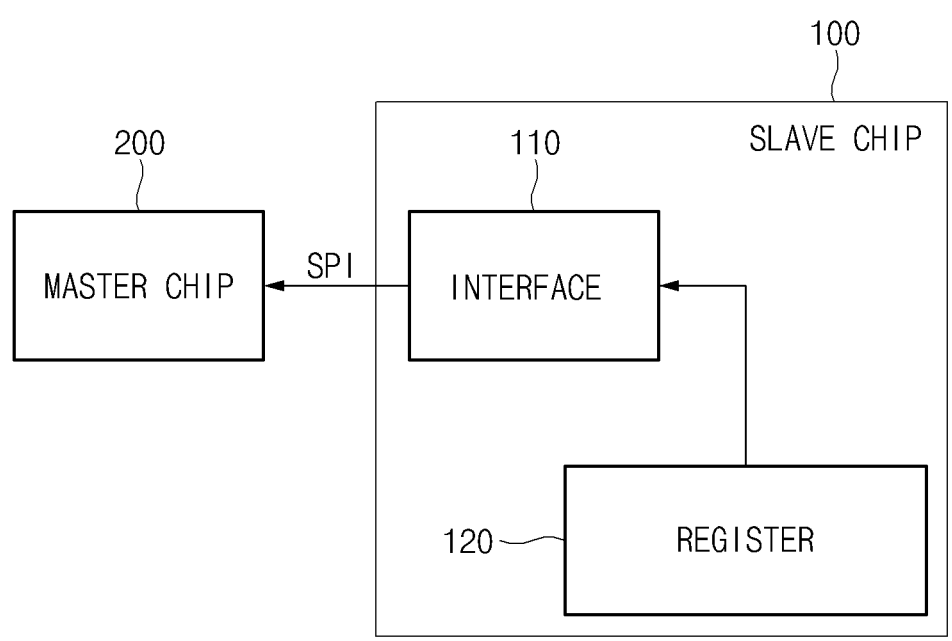
FIGS. 2 to 4 are exemplary time-series based block diagrams illustrating a method for allowing a slave chip and a master chip of a serial communication test system to detect the presence or absence of a data error via SPI communication according to another exemplary embodiment of the present invention.
Figure 3:
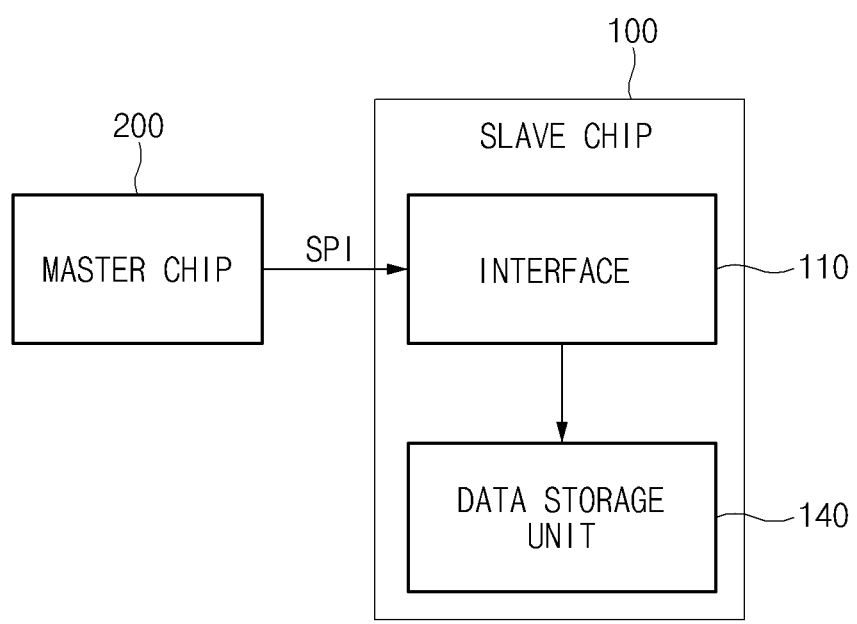
Figure 4:
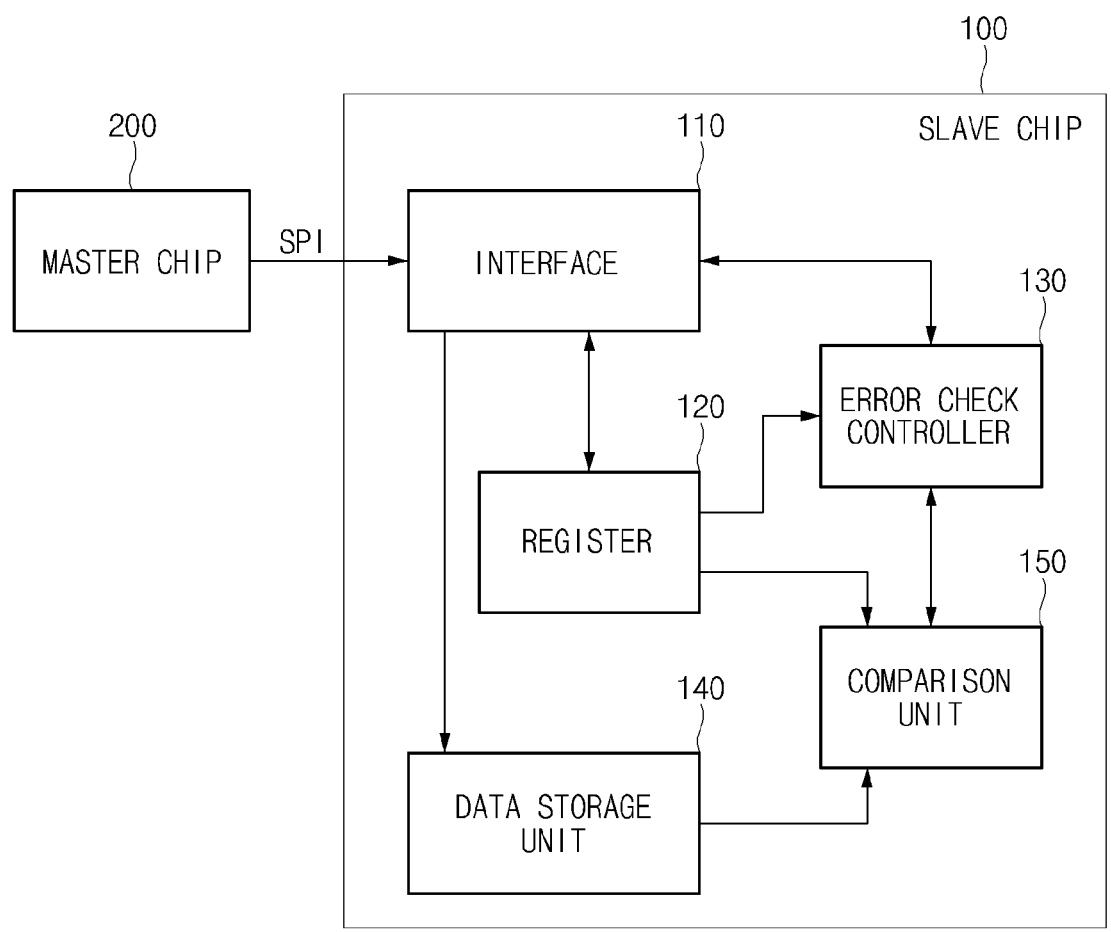

FIGS. 2 to 4 are exemplary time-series based block diagrams illustrating a method for allowing the slave chip 100 and the master chip 200 to detect the presence or absence of a data error via SPI communication. For convenience of description and better understanding of the present invention, FIGS. 2 to 4 illustrate block diagrams of individual operations and data processing thereof.

The master chip 200 and the slave chip 100 may be configured to communicate with each other. Referring to FIG. 2, the slave chip 100 may be configured to transmit data stored in the register 120 to the master chip 200 via the interface 110. In other words, the master chip 200 may be configured to read data to be double checked from the register 120 of the slave chip 100. Referring to FIG. 3, the slave chip 100 may be configured to store data received from the master chip 200 through the interface 100 in the data storage unit 140 through the interface 100. In other words, the master chip 200 may be configured to store again data read from the slave chip 100 in the data storage unit 140 of the slave chip 100.

Referring to FIG. 4, the error check unit 130 may be configured to operate the comparison unit 150. In other words, the comparison unit 150 may be configured to compare data pre-stored in the register 120 with data stored in the data storage unit 140. Accordingly, the comparison unit 150 may be configured to compare data read from the master chip 200 with data retransmitted from the master chip 200 to detect the presence or absence of a data error to determine whether data has been correctly read from the master chip 200.

In accordance with the exemplary embodiment of the present invention, the master chip 200 may be configured to control SPI communication, and the slave chip 100 may be configured to re-confirm whether normal data (i.e., data having no error) has been transmitted from the master chip 200. In addition, when data is transferred from the slave chip 100 to the master chip 200, the slave chip 100 may be configured to perform additional data checking, resulting in an increase in system reliability.

Figure 5:
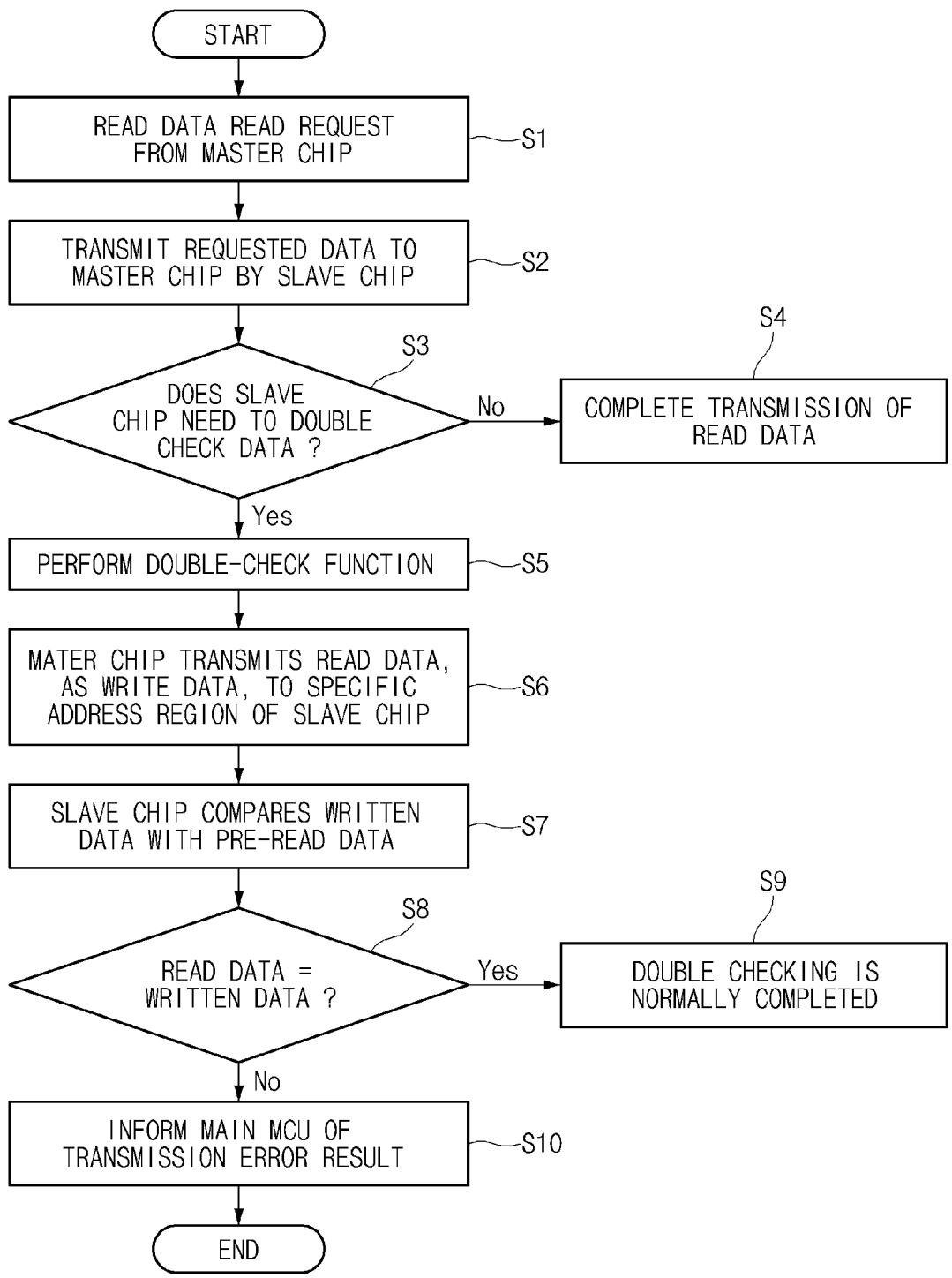
FIG. 5 is an exemplary flowchart illustrating a serial communication test method shown in FIGS. 2 to 4 according to an exemplary embodiment of the present invention.

FIG. 5 is an exemplary flowchart illustrating a serial communication test method shown in FIGS. 2 to 4. Referring to FIG. 5, the master chip 200 may be configured to transmit a request signal for reading data (or a register value) to the slave chip 100 in step S1. In other words, the master chip 200 may be configured to transmit a data-read request signal via the interface 110 of the slave chip 100.

During SPI communication, the slave chip 200 of the exemplary embodiment may be configured to determine whether the master chip 200 has correctly read data. Accordingly, when the master chip 200 reads data stored in the register 120 of the slave chip 100, individual bits may provide significant meaning. When the master chip 200 incorrectly reads the stored data, the slave chip 100 may be configured to output a command for continuously performing a necessary action to solve the erroneous operation. Accordingly, the slave chip 100 may be configured to double check the presence or absence of integrity of important data. Thereafter, the slave chip 100 may be configured to transmit requested data (or a register value) to the master chip 200 in step S2. In other words, the slave chip 100 may be configured to transmit data stored in the register 120 to the master chip 200 via the interface 110.

Subsequently, the slave chip 100 may be configured to operate the error check controller 130 to determine whether data applied to the master chip 120 should be double checked in step S3. In particular, when the slave chip need not double-check read data, the error check controller 130 may be configured to stop transmission of the read data in step S4. Further, when the slave chip 100 needs to double-check data, the error check controller 130 may be configured to double-check the corresponding data in step S5.

Thereafter, the master chip 200 may be configured to re-transmit data having been read from the slave chip 100 to the slave chip 100 through the interface 110. In other words, data transferred from the master chip 200 may be applied to the error check controller 130 of the slave chip 100. The error check controller 130 may be configured to store data received from the master chip 200 in a specific address region of the address storage unit 131 in step S6. Data transferred from the master chip 200 may be stored in the data storage unit 140.

Subsequently, the comparison unit 150 of the slave chip 100 may be configured to compare data written in the data storage unit 140 with data read from the register 120 in step S7. In other words, the comparison unit 150 may be configured to compare data pre-transmitted from the register 120 to the master chip 200 with other data re-transmitted from the master chip 200. The comparison unit 150 may be configured to determine whether data written in the data storage unit 140 is substantially similar to data pre-read from the register 120 in step S8.

When data written in the data storage unit 140 is substantially similar to data pre-read from the register 120, the double-check result may indicate the absence of a data error and the double-check operation may be normally completed in step S9. Additionally, when data written in the data storage unit 140 is different from data pre-read from the register 120, the double-check result may indicate the presence of an error in data transmission. Accordingly, the error check controller 130 of the slave chip 100 may be configured to inform a Micro Control Unit (MCU) of the transmission error result based on the comparison result of the comparison unit 150 in step S10. In particular, the MCU may be a master chip 200 or a separate MCU.

For example, it may be assumed that the slave chip 100 of the exemplary embodiment operates as a drive semiconductor. When a short-to-battery situation occurs at an upper-side part of the drive semiconductor, the slave chip 100 may be configured to first inform the master chip 200 (e.g., MCU) of the corresponding situation using an interrupt or the like.

When a data error occurs although the master chip 200 reads register data from the register 120 of the corresponding slave chip 100 through SPI communication, an operation required for the upper-side part having error(s) may be performed. In particular, the drive semiconductor may malfunction. When the drive semiconductor continuously malfunctions, the drive semiconductor may be physically destroyed.

Further, to prevent the drive semiconductor from being physically destroyed, the master chip 200 may be configured to read register data of the slave chip 100, and re-write the read data in the data storage unit 140 of the slave chip 100. The slave chip 100 may be configured to compare original data stored in the register 120 with data re-stored in the data storage unit 140 by the master chip 200 to determine the presence or absence of data integrity. When the master chip 200 reads incorrect data, the drive semiconductor may be configured to re-transmit a request signal for reading data to the master chip 200 using an interrupt or the like, such that the master chip 200 may read again a value of the register 120.

As is apparent from the above description, the serial communication test device according to the exemplary embodiments may allow the master chip (e.g., drive semiconductor) and the slave chip to double-check the presence or absence of an error in SPI communication, to improve the accuracy and reliability of data communication.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A serial communication test system comprising:
    a master chip configured to:
        output a data-read request signal so as to read data to be error-checked, and
        retransmit the read data; and
    a slave chip configured to:
        transmit the data to be error-checked to the master chip through an interface in response to the data-read request signal,
        write data received from the master chip through the interface, and
        perform error checking by comparing the data transmitted to the master chip with the data received from the master chip,
    wherein the slave chip includes a controller configured to:
        store the data to be error-checked in a register to output the stored data to the master chip through the interface,
        store the data received from the master chip through the interface in a data storage unit,
        compare the data stored in the register with the data stored in the data storage unit,
        when the data stored in the register is substantially similar to the data stored in the data storage unit, determined an address that corresponds to data received from the register using an address storage unit, and
        when the data stored in the register is not substantially similar to the data stored in the data storage unit, determine a presence of an error and transmit a result of erroneous data to the master chip.

2. The serial communication test system according to claim 1, wherein the controller is further configured to:
    selectively turn on and off the error check operation.

3. The serial communication test system according to claim 1, wherein the interface is configured to transmit and receive data to and from the master chip using Serial Peripheral Interface (SPI) communication.

4. The serial communication test system according to claim 1, wherein the slave chip is configured to:
   determine absence of an error and perform a normal operation when the comparison result indicates that the data stored in the register is substantially similar to the data stored in the data storage unit.

5. The serial communication test system according to claim 1 wherein the slave chip is further configured to:
   determine the occurrence of an error to transmit a result of erroneous data to the master chip when the comparison result of the comparison unit indicates that the data stored in the register is different to the data stored in the data storage unit.

6. The serial communication test system according to claim 1, wherein the slave chip is a drive semiconductor.

7. A serial communication test method comprising:
   transmitting, by a controller, data stored in a register to a master chip in response to a data-read request signal received from the master chip;
   determining by the controller, whether the data stored in the register is substantially similar to data to be error-checked;
   storing, by the controller, data received from the master chip to a data storage unit;
   performing, by the controller, error checking by comparing the data stored in the register with the data stored in the data storage unit;
   when the comparison result indicates that the data stored in the register is substantially similar to the data stored in the data storage unit, determining, by the controller, an address that corresponds to data received from the register using an address storage unit; and
   when the comparison result indicates that the data stored in the register is not substantially similar to the data stored in the data storage unit, determining, by the controller, a presence of an error and transmitting, by the controller, a result of erroneous data to the master chip.

8. A non-transitory computer readable medium containing program instructions executed by a controller, the computer readable medium comprising:
   program instructions that transmit data stored in a register to a master chip in response to a data-read request signal received from the master chip;
   program instructions that determine whether the data stored in the register is substantially similar to data to be error-checked;
   program instructions that store data received from the master chip to a data storage unit;
   program instructions that perform error checking by comparing the data stored in the register with the data stored in the data storage unit;
   program instructions that determine an address that corresponds to data received from the register using an address storage unit, when the comparison result indicates that the data stored in the register is substantially similar to the data stored in the data storage unit; and
   program instructions that determine a presence of an error and transmit a result of erroneous data to the master chip when the comparison result indicates that the data stored in the register is not substantially similar to the data stored in the data storage unit.

\* \* \* \* \*